(12) United States Patent
Takahama (10) Patent No.: US 6,305,244 B1
(45) Date of Patent: Oct. 23, 2001

(54) BICYCLE PEDAL

(75) Inventor: Kimitaka Takahama, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/457,852

(22) Filed: Dec. 10, 1999

(51) Int. Cl.[7] .................................................. B62M 3/08
(52) U.S. Cl. ........................................................... 74/594.6
(58) Field of Search ................................ 74/594.6, 594.4; 36/131

(56) References Cited

U.S. PATENT DOCUMENTS

| | | | |
|---|---|---|---|
| 4,686,867 | 8/1987 | Bernard et al. | 74/594.6 |
| 4,762,019 | 8/1988 | Beyl | 74/594.6 |
| 4,840,086 | 6/1989 | Bidal | 74/594.6 |
| 4,928,549 | 5/1990 | Nagano | 74/594.6 |
| 5,131,291 | * 7/1992 | Beyl | 74/594.6 |
| 5,419,218 | 5/1995 | Romano | 74/594.6 |
| 5,755,144 | 5/1998 | Ueda | 74/594.6 |

FOREIGN PATENT DOCUMENTS

359134 * 3/1990 (EP) ..................................... 74/594.6

* cited by examiner

*Primary Examiner*—Mary Ann Green
(74) *Attorney, Agent, or Firm*—Shinjyu Global IP Counselors, LLP (57) ABSTRACT

A bicycle pedal assembly is provided for attaching a shoe thereto via a cleat. The bicycle pedal has a pedal body rotatably coupled to the second end of the pedal shaft for supporting a cyclist's foot. The pedal body has a first end and a second end with a cleat receiving surface located therebetween and a center longitudinal axis extending between the first and second ends. The pedal body preferably has a pair clamping members coupled thereto with at least one of the clamping members being pivotally coupled thereto. At least the pivoting clamping member is constructed of a resilient wire material that is designed to pivot upon a twisting movement between the cleat and the pedal body. In the preferred embodiment, the front or first clamping member is stationary, while the rear or second clamping member is movable. Each of the clamping members has a cleat engagement surface facing in a direction toward the pedal body. The wire clamping member includes at least a first biasing portion and a retaining portion extending from the first biasing portion in a direction transverse to the center longitudinal axis of the pedal body. The first biasing portion is arranged to urge the retaining portion from a release position to a retained position. The retaining portion has one of the cleat engagement surface formed thereon and being configured to apply a force toward the cleat receiving surface of the pedal body.

37 Claims, 9 Drawing Sheets

BICYCLE PEDAL

BACKGROUND OF THE INVENTION

1. Field of the Invention

This invention generally relates to a clipless or step-in bicycle pedal. More specifically, the present invention relates to a bicycle pedal that engages a cleat secured to the sole of a bicycle shoe.

2. Background Information

In recent years, bicycle pedals have been designed for specific purposes such as for comfort, recreational biking, off-road biking, road racing, etc. One particular type of bicycle pedal, which is gaining more popularity, is the step-in or clipless pedal. A step-in or clipless pedal is releasably coupled to a cleat that is secured to the sole of a cyclist's shoe. Thus, the bottom of the cyclist's shoe is fixed to the pedal for transmitting the pedaling force from the cyclist to the pedal of the bicycle. In other words, with clipless pedals, the shoes and the pedals are in a state of constant engagement when the cleats are engaged in the cleat clamping members, so the pedaling force can be transmitted efficiently to the pedals. As a result, clipless pedals are widely employed on racing bicycles used in road racing and off-road bicycles used in mountain bike racing.

The clipless or step-in pedal has a pedal spindle that can be mounted on the crank of a bicycle, a pedal body that is rotatably supported on this pedal spindle, and a cleat engagement mechanism. In an off-road bicycle pedal, a cleat engagement mechanism is formed on both sides of the pedal body. Each cleat engagement mechanism has a pair of cleat clamping members that are fixed on one of the sides of the pedal body for engaging front and rear portions of a cleat. Road racing pedals typically only have a cleat engagement mechanism on one side of the pedal body. In either case, in this type of bicycle pedal, the rider steps onto the pedal and the cleat engagement mechanism automatically grips on to the cleat secured to the bottom of the cyclist's shoe.

More specifically, when attaching the cyclist's shoe to the clipless or step-in pedal via the cleat, the cyclist moves the shoe obliquely downwardly and forwardly relative to the pedal body such that the front end of the cleat engages a front hook or clamping member of the pedal body. Once the front end of the cleat is engaged with the front hook of the pedal body, the cyclist places the rear end of the cleat in contact with a guide portion of the rear hook or clamping member of the pedal body. In this position, the cyclist presses the shoe downwardly against the pedal to cause the rear hook or clamping member to initially pivot rearwardly against the force of a spring to move the rear hook or clamping member to a cleat releasing position. The rear end of the cleat then enters a position opposite a back face of the rear hook or clamping member. Then, the rear hook or clamping member returns under the force of a biasing member or spring so that the rear hook or clamping member engages the rear end of the cleat. This engagement fixes the cyclist's shoe to the pedal via the cleat.

When releasing the shoe from the pedal, the cyclist will typically turn the shoe about an axis perpendicular or approximately perpendicular to the tread of the pedal, using the front end of the cleat as a pivoting point. As a result of this pivoting action, the rear hook or clamping member is pivoted rearwardly against the force of the spring to a cleat releasing position to release the shoe.

When clipless or step-in pedals are used for road type bikes, the pedal is typically only provided with a single clamping assembly such that the cyclist's shoe can only be coupled to one of the two sides of the pedal. Off-road or mountain type bikes, on the other hand, usually have a pair of clamping assemblies such that the cyclist's shoe can be clamped to either side of the pedal. In either case, it is desirable to design the pedal to be as compact and lightweight as possible.

One problem with clipless or step-in pedals is that they can malfunction if dirt or mud gets into the cleat engagement mechanism. Once the cleat clamping members become dirty or clogged with mud, the cleat cannot be engaged in the cleat clamping members, and the shoe cannot be attached to the pedal. Specifically, the dirt or mud often clogs the biasing mechanism such that the clamping members may not operate properly.

In view of the above, there exists a need for a bicycle pedal which overcomes the above mentioned problems in the prior art. This invention addresses this need in the prior art as well as other needs, which will become apparent to those skilled in the art from this disclosure.

SUMMARY OF THE INVENTION

One object of the present invention is to provide a clipless or step-in bicycle pedal that is inexpensive to manufacture.

Another object of the present invention is to provide a clipless or step-in bicycle pedal that operates well in dirty and muddy environments.

Another object of the present invention is to provide a bicycle pedal and cleat with an improved releasing action between the bicycle pedal and cleat.

Another object of the present invention is to provide a bicycle pedal that is relatively lightweight.

The foregoing objects can basically be attained by providing a bicycle pedal adapted to be coupled to a shoe via a cleat. The bicycle pedal includes a pedal shaft, a pedal body, a first clamping member and a second wire clamping member. The pedal shaft has a first end for attachment to a bicycle crank and a second end for supporting a cyclist's foot. The pedal body is rotatably coupled to the second end of the pedal shaft. The pedal body has a first end and a second end with a cleat receiving surface located therebetween and a center longitudinal axis extending between the first and second ends. The first clamping member is coupled to the pedal body and has a first cleat engagement surface facing in a first direction. The second wire clamping member is coupled to the pedal body at a location that is longitudinally spaced from the first clamping member. The second wire clamping member includes at least a first biasing portion and a retaining portion extending from the first biasing portion in a direction transverse to the center longitudinal axis of the pedal body. The second wire clamping member has a second cleat engagement surface facing in the first direction and configured relative to the first biasing portion to pivot about a secondary pivot axis to apply a force toward the cleat receiving surface of the pedal body.

The foregoing objects can further be attained by providing a bicycle pedal adapted to be coupled to a bicycle shoe via a cleat. The bicycle pedal includes a pedal shaft, a pedal body, a first clamping member and a second wire clamping member. The pedal shaft has a first end for attachment to a bicycle crank and a second end for supporting a cyclist's foot. The pedal body is rotatably coupled to the second end of the pedal shaft. The pedal body has a first end and a second end with a cleat receiving surface located therebetween and a center longitudinal axis extending between the first and second ends. The first clamping member is coupled to the pedal body and has a first cleat engagement surface facing in a first direction. The second wire clamping member is coupled to the pedal body at a location that is longitudinally spaced from the first clamping member. The second wire clamping member includes first and second biasing portions and a retaining portion extending from the first and second biasing portions in a direction transverse to the center longitudinal axis of the pedal body. The first and second biasing portions are coupled to urge the retaining portion from a release position to a retained position about a main pivot axis. The first and second biasing portions and the retaining portion are arranged such that to apply a substantially the same force on the retaining portion during rearward movement of the retaining portion by a lateral twisting motion of a cleat on the retaining portion.

The foregoing objects can further be attained by providing a bicycle pedal adapted to be coupled to a shoe via a cleat. The bicycle pedal includes a pedal shaft, a pedal body, a first clamping member and a second wire clamping member. The pedal shaft has a first end for attachment to a bicycle crank and a second end for supporting a cyclist's foot. The pedal body is rotatably coupled to the second end of the pedal shaft. The pedal body has a first end and a second end with a cleat receiving surface located therebetween and a center longitudinal axis extending between the first and second ends. The first clamping member is coupled to the pedal body and has a first cleat engagement surface facing in a first direction. The second wire clamping member is coupled to the pedal body at a location that is longitudinally spaced from the first clamping member. The second wire clamping member includes at least a first biasing portion, a second biasing portion and a retaining portion extending from the first biasing portion in a direction transverse to the center longitudinal axis of the pedal body. The first and second biasing portions are coupled to urge the retaining portion from a release position to a retained position about a main pivot axis. The retaining portion has a second cleat engagement surface facing in the first direction and lying in a third plane located on a second opposite side of the first plane.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
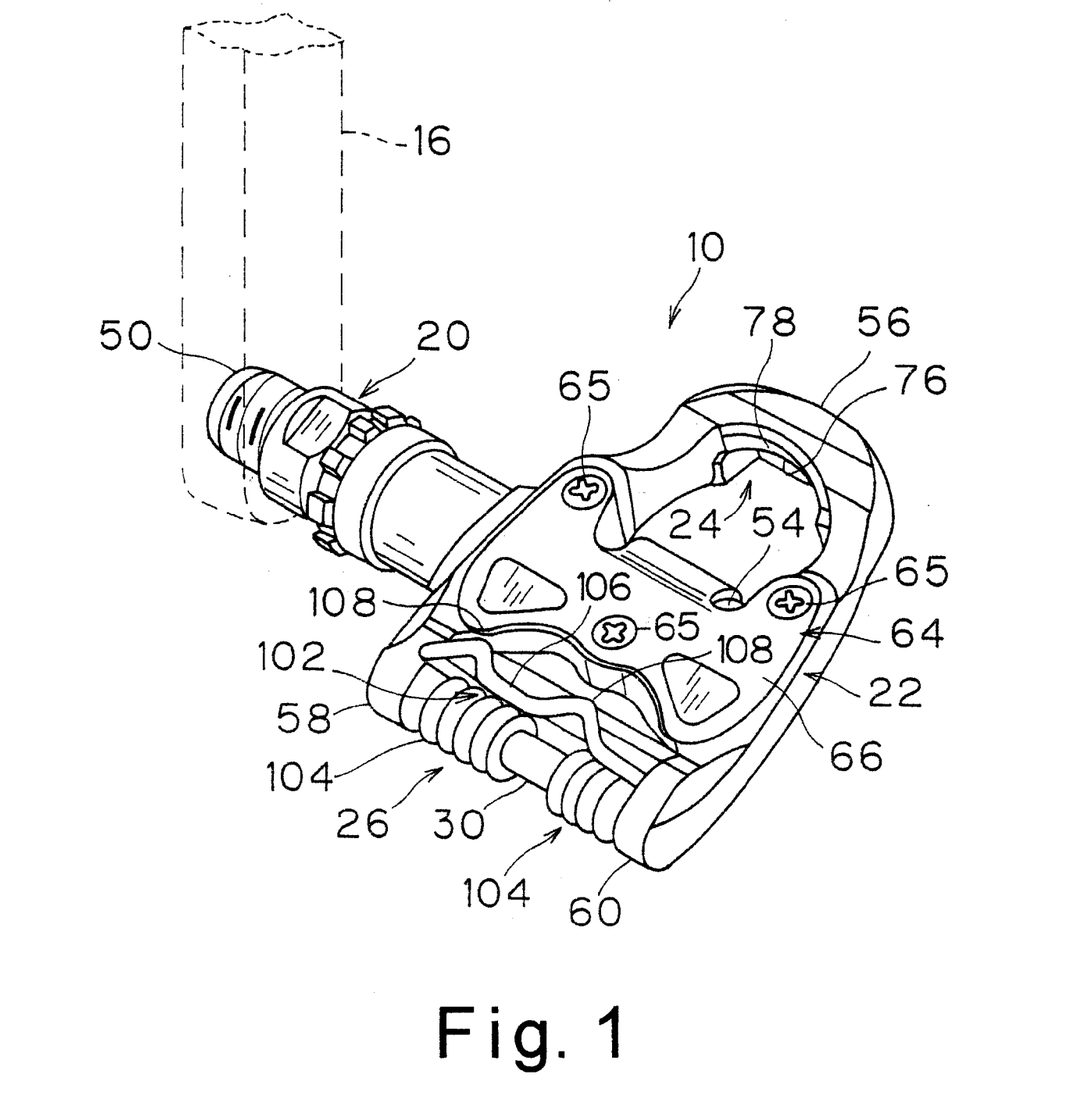
FIG. 1 is a top perspective view of a right bicycle pedal coupled to a crank arm and adapted to be coupled to a cleat of a bicycle shoe in accordance with a first embodiment of the present invention.
Figure 2:
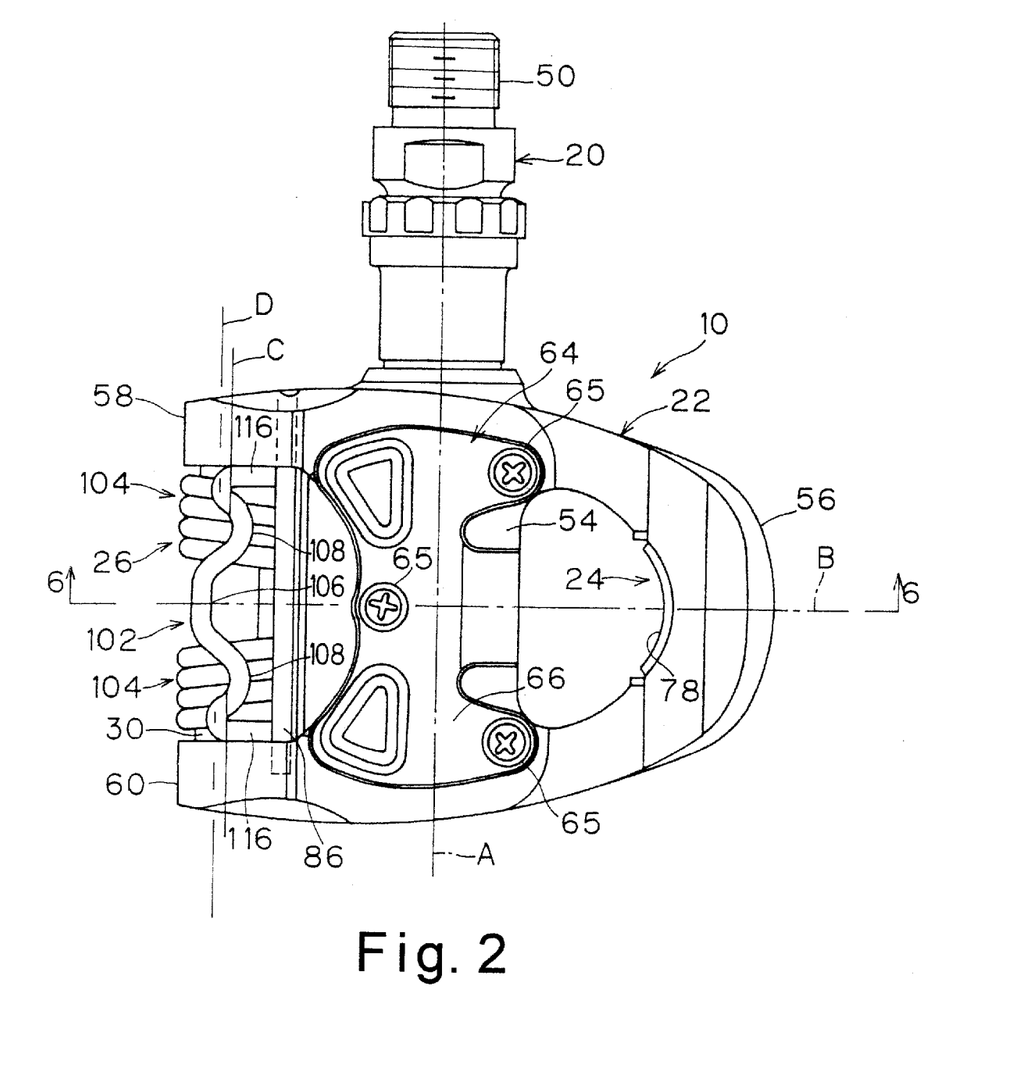
FIG. 2 is a top plan view of the right bicycle pedal illustrated in FIG. 1 in accordance with a first embodiment of the present invention.
Figure 3:
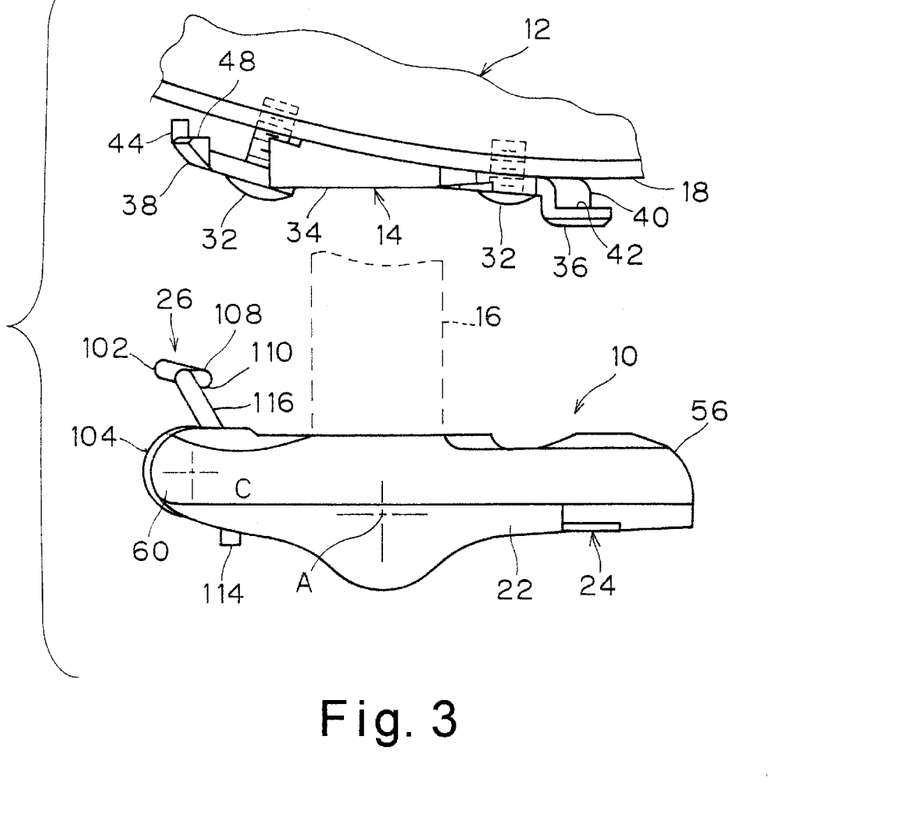
FIG. 3 is an exploded, outside elevational view of a bicycle shoe and the right bicycle pedal illustrated in FIGS. 1 and 2 in accordance with a first embodiment of the present invention.

Referring initially to FIGS. 1 through 8, a bicycle pedal 10 is illustrated in accordance with the first embodiment of the present invention. Bicycle pedal 10 is a clipless or step-in pedal that can be used with a bicycle shoe 12 with a cleat 14 coupled thereto. Bicycle pedal 10 is especially designed for use with a road bicycle as opposed to use with an off-road bicycle. Of course, bicycle pedal 10 can be used on any type of bicycle if needed and/or desired. Moreover, bicycle pedal 10 can be constructed as an off-road pedal such that cleat 14 can be attached to either side of bicycle pedal 10. As seen in FIGS. 1 and 3, bicycle pedal 10 is fixedly coupled to bicycle crank arm 16 of a bicycle for rotation therewith, while cleat 14 is fixedly coupled to the bottom of sole 18 of a shoe 12.

Bicycle pedal 10 illustrated in FIGS. 1 through 8 is a right side pedal. Of course, the same pedals are provided on the right and left sides of the bicycle, except that the left side pedal 10 is a mirror image of the right side pedal 10. Thus, it will be apparent to those skilled in the art that the description of the right pedal 10 also applies to a left pedal.

Figure 4:
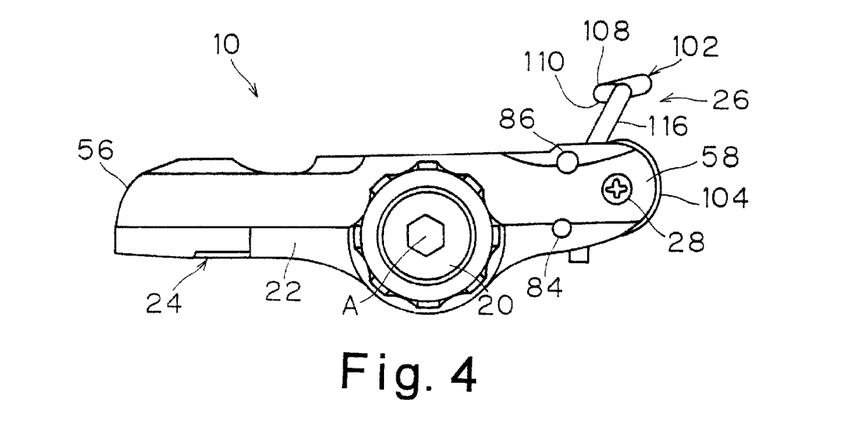
FIG. 4 is an inside elevational view of the right bicycle pedal illustrated in FIGS. 1–3 in accordance with a first embodiment of the present invention.
Figure 6:
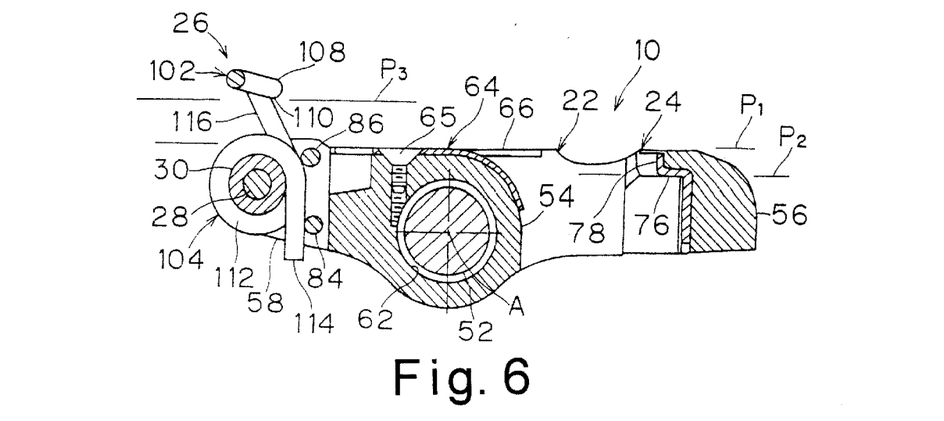
FIG. 6 is a longitudinal cross-sectional view of the bicycle pedal illustrated in FIGS. 1–5 as seen along section line 6—6 of FIG. 2.
Figure 8:
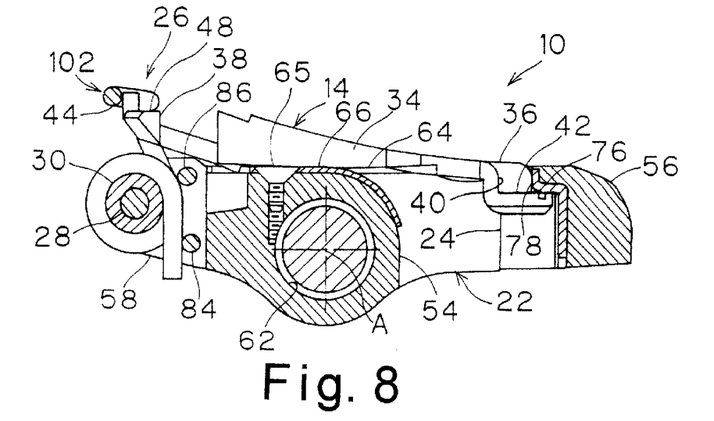
FIG. 8 is a longitudinal cross-sectional view of the right bicycle pedal illustrated in FIG. 7 with the cleat coupled thereto in accordance with a first embodiment of the present invention.
Figure 9:
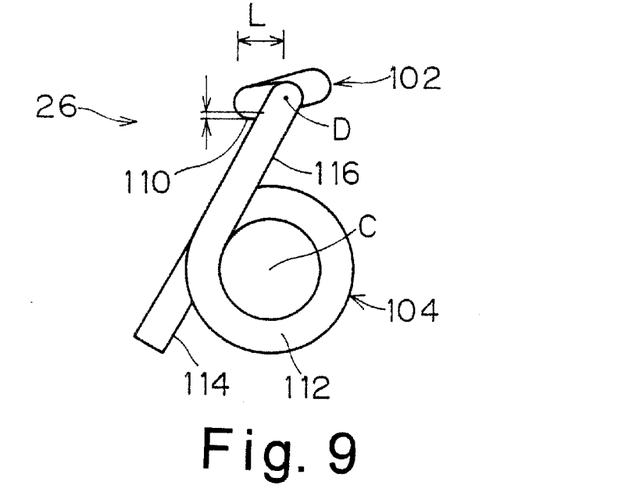
FIG. 9 is a side elevational view of the rear clamping member for the bicycle pedal illustrated in FIGS. 1–8.
Figure 10:
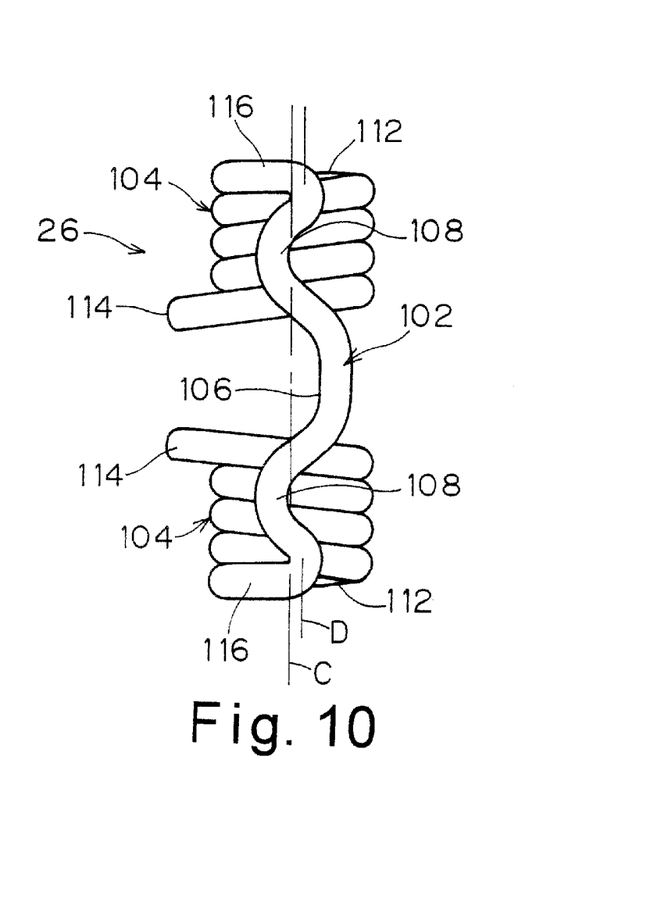
FIG. 10 is a top plan view of the rear clamping member illustrated in FIG. 9 for the bicycle pedal illustrated in FIGS. 1–8.
Figure 11:
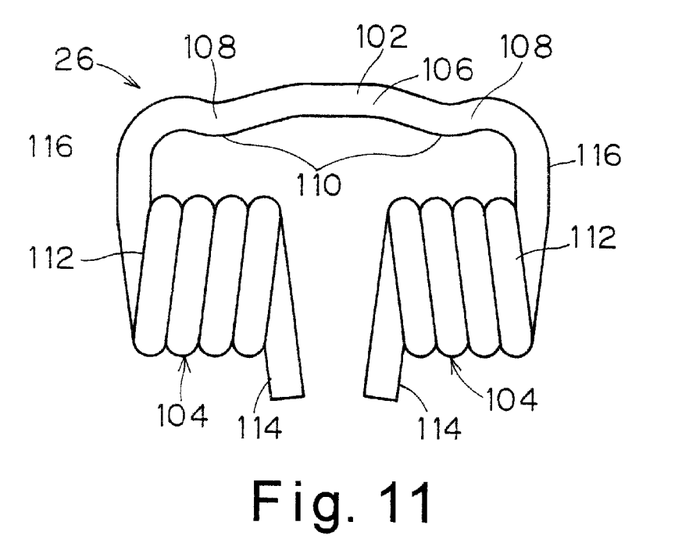
FIG. 11 is a rear elevational view of the rear clamping member illustrated in FIGS. 9 and 10 for the bicycle pedal illustrated in FIGS. 1–8.
Figure 12:
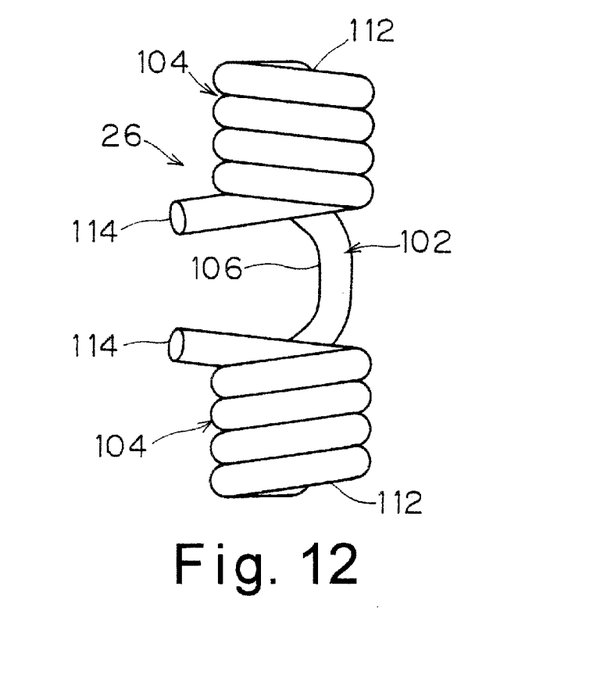
FIG. 12 is a bottom plan view of the rear clamping member illustrated in FIGS. 9–11 for the bicycle pedal illustrated in FIGS. 1–8.
Figure 13:
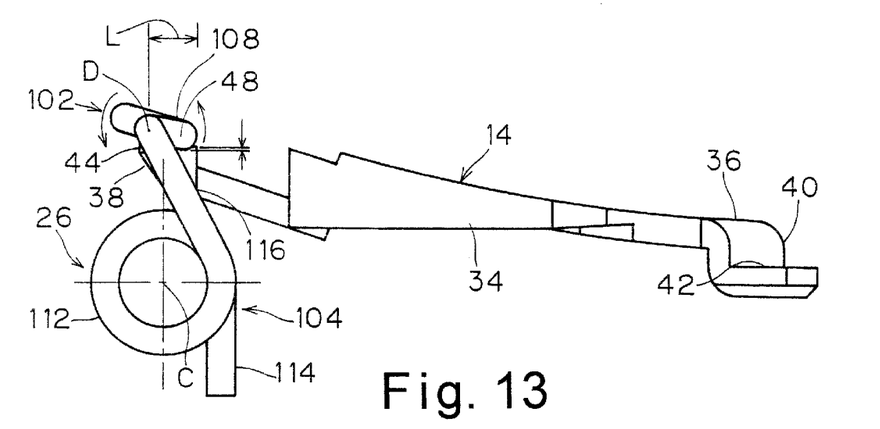
FIG. 13 is a diagrammatic side elevational view of the rear clamping member and the cleat overlapping.
Figure 14:
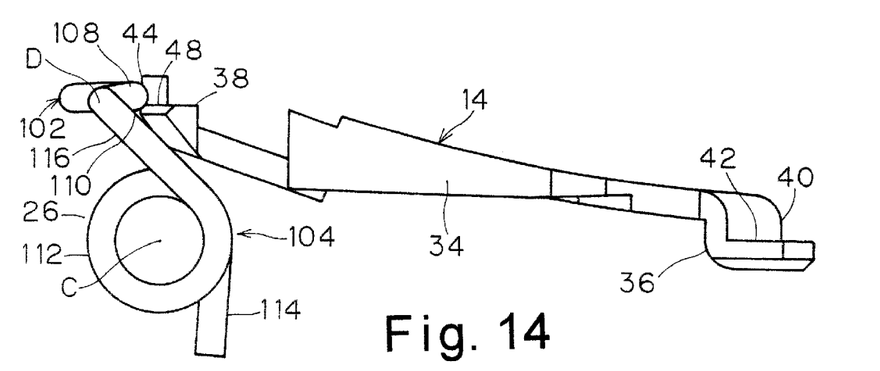
FIG. 14 is a diagrammatic side elevational view of the rear clamping member and the cleat, the rear clamping member being biased rearwardly by the cleat.
Figure 15:
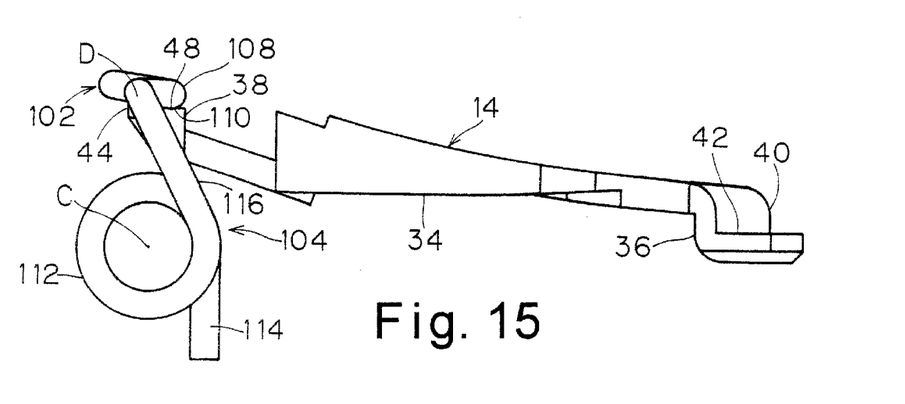
FIG. 15 is a diagrammatic side elevational view of the rear clamping member and the cleat in the coupled or retained position.

As seen in FIGS. 1, 2 and 4, bicycle pedal 10 basically includes a pedal shaft or spindle 20 adapted to be coupled to crank arm 16 and a pedal body 22 rotatably coupled to spindle 20 for supporting a cyclist's foot. Pedal body 22 basically includes a first clamping member 24 and second clamping member 26. The first or front clamping member 24 is fixed to pedal body 22 to form a stationary clamping member. As seen in FIGS. 6 and 8, the second or rear clamping member 26 is pivotally coupled to pedal body 22 by a pivot pin 28 and sleeve 30, as discussed below in more detail.

Cleat 14 is designed to releasably couple sole 18 of shoe 12 to bicycle pedal 10 by first and second clamping members 24 and 26. This type of pedal is often called a step-in or clipless pedal. Specifically, cleat 14 is engaged with pedal 10 by pressing cleat 14 into pedal 10 with a forward and downward motion. This releasably locks cleat 14 to pedal 10. Cleat 14 can be released from pedal 10 by twisting the heel of the shoe 12 to the outside of pedal 10 as discussed below in more detail.

Referring to FIG. 3, bicycle shoe cleat 14 is fixed to sole 18 of shoe 12 by a pair of screws or fasteners 32 in a conventional manner. Since pedal cleat 14 is relatively conventional and its specific construction is not critical to the present invention, the construction of cleat 14 will not be discussed in detail herein. While cleat 14 is illustrated as a one-piece member, it will be apparent to those skilled in the art from this disclosure that cleat 14 can be constructed of several separate pieces.

Basically, cleat 14 of the illustrated embodiment includes a middle attachment portion 34, a front coupling portion 36 extending from one end of the middle attachment portion 34 and a second coupling portion 38 extending from the other end of the middle attachment portion 34. In the illustrated embodiment, the first coupling portion 36 is a front coupling member that engages the front clamping member 24, while the second coupling portion 38 is a rear coupling member that engages the clamping member 26.

Middle attachment portion 34 has an upper sole side facing in a first direction for engaging sole 18 of shoe 12 and a lower side facing in a second direction, which is substantially opposite to the first direction. Preferably, middle attachment portion 34 and coupling portions 36 and 38 are integrally formed as a one-piece, unitary member which is constructed from a suitable rigid material. For example, cleat 14 can be constructed from a metallic material, which is stamped from a sheet metal material, or cast or machined.

Front coupling portion 36 of cleat 14 forms a front nose portion with a curved stop surface 40 and a first coupling surface 42. The rear coupling portion 38 of cleat 14 forms a rear heel portion with a curved stop surface 44 and a second coupling surface 48. The first and second coupling surfaces 42 and 48 face substantially in the same direction for engaging the first and second clamping members 24 and 26 respectively. The curved stop surfaces 40 and 44 are designed to engage the first and second clamping members 24 and 26 for limiting relative longitudinal movement. The front stop surface 40 of cleat 14 also acts as a pivot point for releasing cleat 14 from pedal body 22.

Referring again to FIGS. 1 through 3, pedal spindle 20 has a first end 50 with threads formed thereon for threadedly coupling pedal 10 to crank 16 in a conventional manner. As seen in FIGS. 6 and 8, the other or second end 52 of pedal spindle 20 rotatably supports pedal body 22 in a conventional manner, e.g. via bearings (not shown). Pedal body 22 can freely rotate about the center longitudinal axis A of pedal spindle 20. Since pedal spindle 20 is relatively conventional and its specific construction is not critical to the present invention, the construction of pedal spindle 20 will not be discussed in detail herein.

Figure 5:
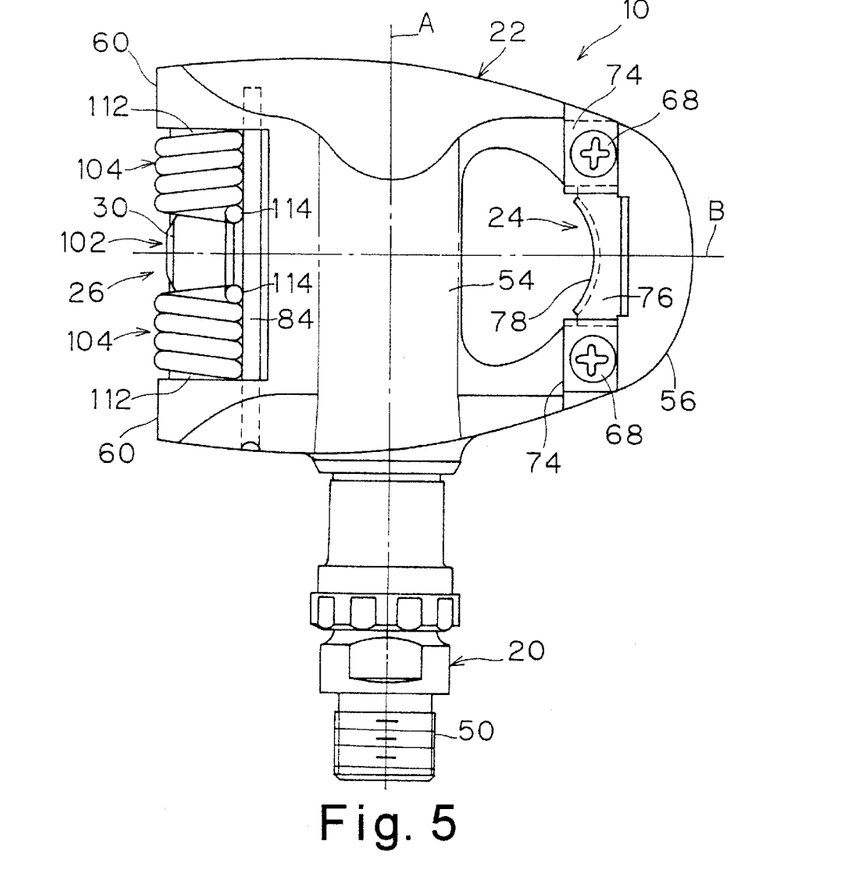
FIG. 5 is a bottom plan view of the right bicycle pedal illustrated in FIGS. 14 in accordance with a first embodiment of the present invention.

Pedal body 22 is preferably made of a lightweight material such as an aluminum alloy. Preferably, one of the clamping members 24 or 26 is located at each end of pedal body 22 as best seen in FIGS. 2 through 5. Pedal body 22 has a main center longitudinal axis B extending between the front and the rear ends as seen in FIGS. 2 and 5. Center longitudinal axis B of pedal body 22 extends substantially perpendicular to center longitudinal axis A of pedal shaft 20. As shown in FIG. 2 and 5, pedal body 22 has a main frame with a center tubular portion 54, a curved front end portion 56 extending from center tubular portion 54, and a pair of support members 58 and 60 forming the rear end portion of pedal body 22. Pedal spindle 20 is received in a bore 62 formed in center tubular portion 54 so that pedal body 22 rotates about center longitudinal axis A.

A cleat seat or plate 64 is coupled to center tubular portion 54 by three screws or fasteners 65. Cleat seat 64 has a flat upper cleat receiving surface 66 for supporting cleat 14. The cleat receiving surface 66 lies in a plane $P_1$ as seen in FIG. 6.

A cleat receiving area is formed between clamping members 24 and 26 for securing cleat 14 to pedal body 22. First clamping member 24 is fixedly coupled to the front end portion 56 of pedal body 22 via a pair of screws or fasteners 68 as seen in FIG. 5. The rear clamping member 26 is pivotally coupled in the space between support members 58 and 60 of pedal body 22 about the main pivot axis C. Preferably, a pivot pin 28 and sleeve 30 are used to pivotally couple rear clamping member 26 between support members 58 and 60 of pedal body 22.

First clamping member 24 is preferably constructed of a separate member that is fixedly secured to the bottom of pedal body 22 by screws 68 as seen in FIG. 5. Of course, it will be apparent to those skilled in the art from this disclosure that first clamping member 24 can be formed as a unitary part of pedal body 22. Preferably, first clamping member 24 is constructed of a metallic sheet material such as stainless steel or other non-corrosive materials. First clamping member 24 has a pair of mounting flanges 74 with holes for receiving fasteners or screws 68 to fixedly secure first clamping member 24 to pedal body 22.

The first clamping member 24 is configured to form a first cleat engagement surface 76 and a first cleat restricting surface 78. As best seen in FIG. 6, the cleat engagement surface 76 lies in a plane $P_2$ that is substantially parallel to the plane $P_1$ of the cleat receiving surface 66. Plane $P_2$ of the cleat engagement surface 76 is closer to the longitudinal axis A of spindle 20 than the plane $P_1$ of the cleat receiving surface 66. The cleat engagement surface 76 is designed to engage first coupling surface 42 of cleat 14 so that the pedaling force can be transmitted from the cyclist to the pedal 10.

The cleat restricting surface 78 is a curved surface that preferably lies substantially perpendicular to the plane $P_2$ of the cleat engagement surface 76. The cleat restricting surface 78 limits forward movement of the cleat 14 by engaging curved stop surface 40 of cleat 14 as seen in FIG. 8. Cleat restricting surface 78 also acts as a pivoting point for cleat 14 during a releasing motion of cleat 14 relative to pedal body 22. Preferably, cleat restricting surface 78 is a concaved surface that faces towards the second clamping member 26. Thus, curved cleat restricting surface 78 forms a cleat receiving recess that receives the front nose portion of cleat 14 therein.

Figure 7:
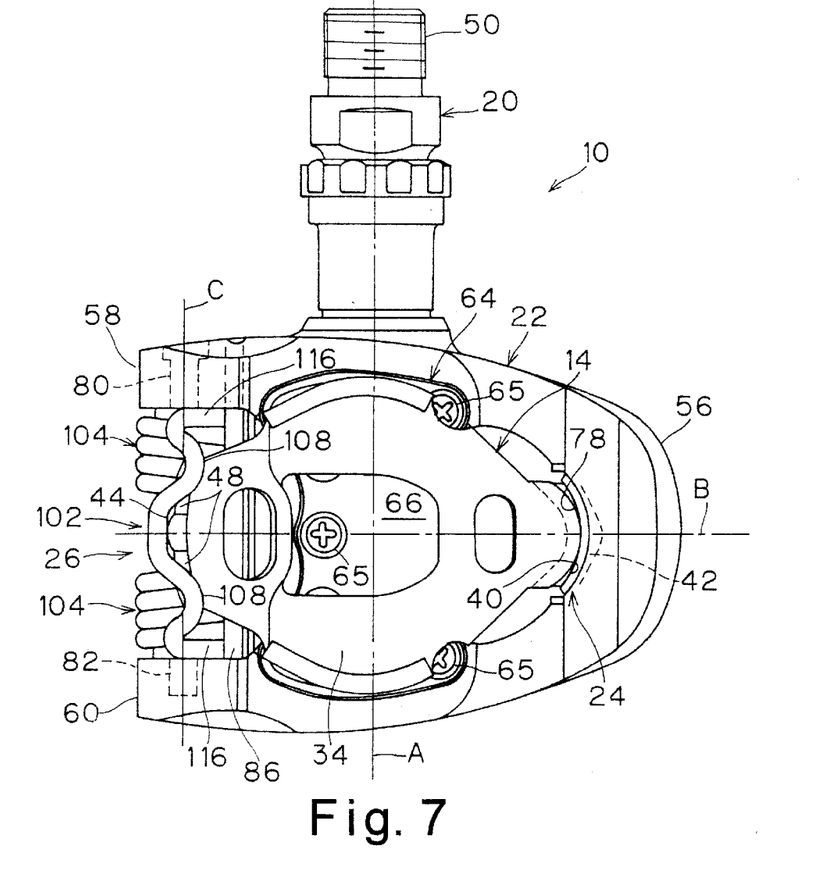
FIG. 7 is a top plan view of the right bicycle pedal illustrated in FIGS. 1–6 with a cleat coupled thereto in accordance with a first embodiment of the present invention.

Turning now to rear clamping member 26, support members 58 and 60 of pedal body 22 extend rearwardly from center tubular portion 54 and are laterally spaced apart for pivotally receiving rear clamping member 26 therebetween. Holes 80 and 82 are formed support members 58 and 60 for fixedly receiving pivot pin 28 therein to pivotally couple clamping member 26 thereto as seen in FIG. 7. Preferably, pivot pin 28 is a screw or threaded fastener that extends between support members 58 and 60. The hole 80 of support member 58 is an unthreaded bore extending therethrough. Hole 82 of support member 60 is a blind threaded bore that only extends partially through support member 60 to provide an attractive outward appearance along the outside surface of pedal 10.

As best seen in FIGS. 4 through 8, two stop pins 84 and 86 also extend between support members 58 and 60 for pre-loading second clamping member 26 so that second clamping member 26 is not loosely coupled to pedal body 22. Stop pins 84 and 86 have their first ends located in bores formed in support member 58, while their second ends are located in bores formed in support member 60. Preferably, the bores in support member 58 are throughbores, while bores of the support member 60 are blind bores to provide an attractive outward appearance along the outside surface of pedal 10. The blind bores of support member 60 can be threaded to secure the stop pins 84 and 86 between support members 58 and 60. Alternatively, stop pins 84 and 86 can be securely fastened between support members 58 and 60 using other conventional methods. For example, the stop pins 84 and 86 can be press-fitted or bonded to support members 58 and 60. Moreover, stop pins 84 and 86 can be eliminated by configuring the pedal body 22 so as to perform the function of the stop pins, i.e., pre-loading second clamping member 26 so that second clamping member 26 is not loosely coupled to pedal body 22.

As best seen in FIGS. 9 through 12, rear clamping member 26 is preferably a one-piece, unitary member that is formed of a resilient wire. The wire of rear clamping member 26 preferably has a circular cross-section so that the curvature of the wire acts as a guide surface. Clamping member 26 has a center retaining portion 102 and a pair of biasing portions 104 coupled to the ends of retaining portion 102. Retaining portion 102 extends from biasing portions 104 in a direction transverse to the center longitudinal axis B of pedal body 22.

Retaining portion 102 has generally a "W" or "M" shape as viewed from above pedal 10. A cleat receiving section 106 is formed at the center of retaining portion 102. The retaining portion 102 also includes a pair of cleat restricting sections 108 located on the sides of the cleat receiving section 106. The cleat restraining sections 108 are configured and arranged to apply a downward force towards cleat receiving surface 66 of the pedal body 22. Accordingly, the second clamping member 26 holds the cleat 14 against cleat receiving surface 66 of the pedal body 22 so that no vertical play exists therebetween.

The cleat restricting sections 108 engage coupling surface 48 of the cleat 14. More specifically, cleat restricting sections 108 form a second engagement surface 110 that engages coupling surface 48 of cleat 14. The second engagement surface 110 lies in a plane $P_3$ that is parallel to planes $P_1$ and $P_2$. The plane $P_3$ is located above the plane $P_1$ of the cleat receiving surface 66 as seen in FIG. 6. In other words, the first and second cleat engagement surfaces 76 and 110 face in substantially the same direction and lie on opposite sides of the plane $P_1$ of the cleat receiving surface 66 as seen in FIG. 6. This arrangement provides for efficient transfer of the pedaling force from the cyclist to the pedals. More specifically, the sole 18 of the shoe 12 is located closer to the longitudinal axis A of spindle 20 than in prior art pedals in which both of the cleat engagement surfaces are located above the plane of the cleat seat or plate 64.

Biasing portions 104 each have a coiled section 112 mounted on pivot pin 28, a first arm 114 extending from the coiled section 112 and engaging the lower stop pin 84, and a second arm 116 extending between the coiled section 112 and the cleat retaining portion 102. The second arms 116 also engage the upper stop pin 86 such that the coiled sections 112 are pre-loaded as seen in FIG. 6. FIGS. 9–12 illustrate the rear clamping member 26 in an unloaded state.

The biasing portions 104 normally urge the retaining portion 102 of the clamping member 26 about pivot pin 28 from its cleat releasing position to a cleat engaging or retaining position. In other words, biasing portions 104 normally maintain clamping member 26 in its cleat engaging or cleat retained position as seen in FIGS. 6 and 8. Sleeve 30 is located between pin 28 and the inner surface of the coiled sections 112 such that sleeve 30 acts as a bushing during relative rotation of the coiled sections 112 relative to the pivot pin 28.

Retaining portion 102 is coupled to the upper ends of the second arms 116 of the biasing portions 104 such that the retaining portion 102 can pivot about secondary pivot axis D. Secondary pivot axis D is substantially parallel to the main pivot axis C of the biasing portions 104. Accordingly, the retaining portion 102 extends forwardly relative to the second arms 116 of the biasing portions 104 to form a lever arm L that applies a downward force onto cleat 14 towards the cleat receiving surface 66 of the pedal body 22. More specifically, cleat restricting sections 108 of retaining portion 102 form lever arm L. Preferably, cleat restricting sections 108 are angled forwardly and slightly downwardly towards cleat receiving surface 66.

The cleat receiving section 106 is curved with a concaved cleat restricting surface facing towards the first clamping member 24. The cleat receiving section 106 is designed to engage the coupling portion 38 of cleat 14. Cleat receiving section 106 limits rearward movement of cleat 14 as well as limits the amount of side-to-side movement of the cleat 14 relative to the pedal body 22. Preferably, the concaved surface of the cleat receiving section 106 is spaced approximately 55–60 millimeters from the concaved surface of the cleat restricting surface 78 of the front clamping member 24. In the most preferred embodiment, the spacing between the concaved cleat restricting surfaces of the clamping members 24 and 26 is spaced approximately 57 millimeters±0.2 millimeters when the cleat 14 is not engaged between the clamping members 24 and 26. When the cleat 14 is engaged with the clamping members 24 and 26 the longitudinal spacing between the concaved cleat restricting surfaces of the first and second clamping members 24 and 26 is approximately 57.5 millimeters±0.05 millimeters. In other words, the cleat 14 has a longitudinal length that is approximately 0.5 millimeters larger than the longitudinal distance between the concaved cleat restricting surfaces of the first and second clamping members 24 and 26 so that when the cleat 14 is engaged therebetween, the biasing portions 104 apply a forward restraining force to limit longitudinal movement of the cleat 14 relative to the pedal body 22.

Operation of pedal 10 will now be briefly described with particular reference to FIGS. 7, 8 and 12–15. When bicycle shoe 12 is attached to the pedal 10, the tip of the shoe 12 is moved forward towards the front clamping member 24. Once the tip or front nose portion of the cleat 14 has been inserted underneath the first clamping member 24, a downward force is applied to the heel side of the shoe 12, such that the shoe 12 is pushed downwardly towards the pedal 10. When the heel is pressed down further from this initial state, the rear heel portion of the cleat 14 contacts the retaining portion 102 of the rear clamping member 26 to force it rearwardly. This causes retaining portion 102 to rotate about the main axis C against the biasing forces of the coiled sections 112.

Cleat 14 then slides past the cleat restricting sections 108. Once the cleat 14 has slid past the cleat restricting sections 108, the biasing force of the coiled sections 112 causes the retaining portion 102 to spring back almost to its original position. Since the front facing curved surface of cleat receiving section 106 contacts the rear coupling portion 38 of cleat 14, rear clamping member 26 cannot return completely to its original position. The stop surfaces 40 and 44 are designed to engage the cleat restricting surfaces of the first and second clamping members 24 and 26 for limiting relative longitudinal movement. The front stop surface 40 of cleat 14 also acts as a pivot point for releasing cleat 14 from pedal body 22. Preferably, the coiled sections 112 are slightly more compressed than their original state to apply a forwardly directed force on cleat 14. As a result, cleat 14 is held against longitudinal movement between the curved cleat restricting surfaces of the first and second clamping members 24 and 26. Moreover, vertical movement of cleat 14 is prevented because cleat 14 is sandwiched between the cleat receiving surface 66 and the first and second cleat engagement surfaces 76 and 110. Moreover, cleat 14 is sized such that the cleat restricting sections are deflected in an upward direction about secondary pivot axis D. In the preferred embodiment, this deflection is approximately 0.5 millimeters±0.2 millimeters.

When the shoe 12 is to be removed from the pedal, the heel portion of the shoe 12 is twisted to the outside. This twisting motion causes the cleat 14 to pivot about the curved cleat restricting surface 78 of the first clamping member 24, while the rear end of the cleat 14 moves outwardly relative to the pedal body 22. This twisting motion will cause the retaining portion 102 to rotate against the energizing force of the coiled sections 112 of the rear clamping member 26. During this twisting of cleat 14 relative to pedal body 22, the first and second biasing portions 104 apply substantially the same force on the retaining portion 102 to control the releasing force required to release cleat 14 from pedal 10. After sufficient twisting of cleat 14, the engagement of the rear end of the cleat 14 will be released and the cleat 14 can be removed from the pedal 10.

Second Embodiment

Figure 16:
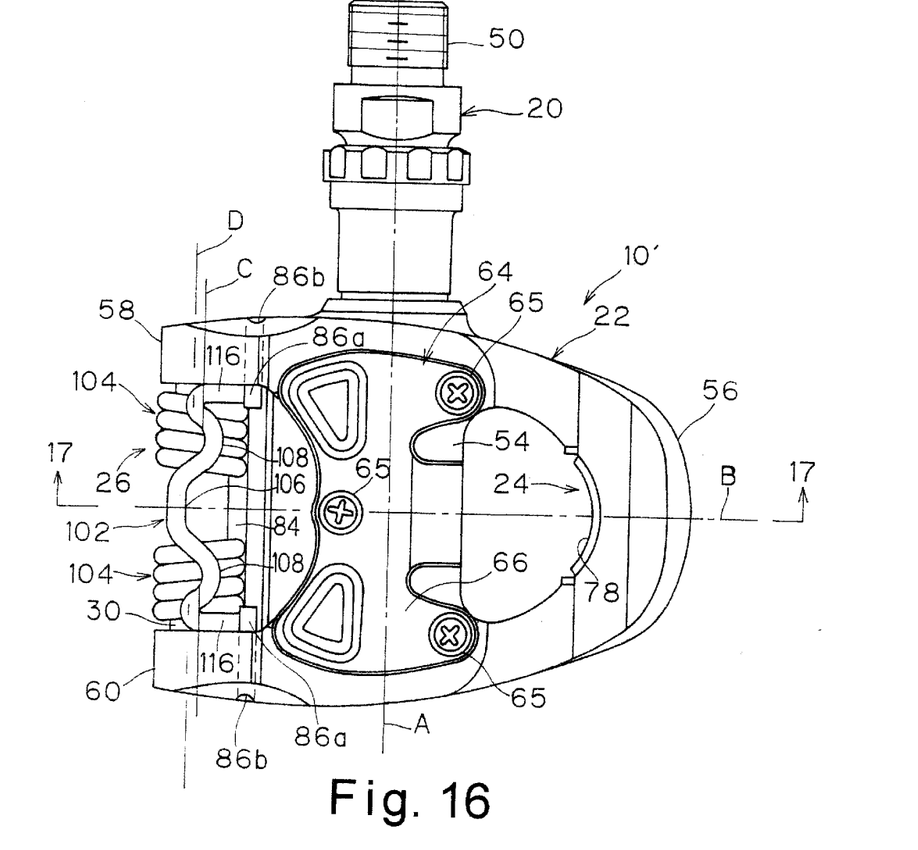
FIG. 16 is a top plan view of a right bicycle pedal in accordance with a second embodiment of the present invention.
Figure 17:
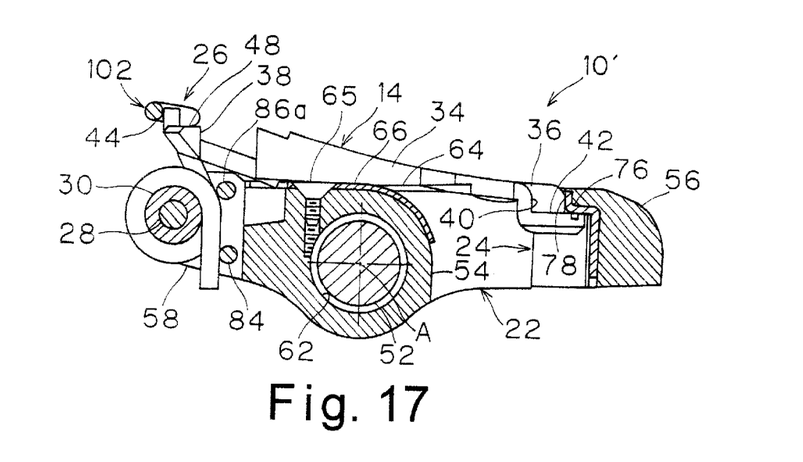
FIG. 17 is a longitudinal cross-sectional view of the bicycle pedal illustrated in FIG. 16, as seen along section line 17—17 of FIG. 16 in accordance with a second embodiment of the present invention.

Referring now to FIGS. 16 and 17, a bicycle pedal 10' in accordance with a second embodiment of the present invention is illustrated. The bicycle pedal 10' of the second embodiment is substantially identical to the bicycle pedal 10 the first embodiment. Therefore, bicycle pedal 10' will not be discussed or illustrated in detail herein. Basically, the only significant difference between this second embodiment and the first embodiment is that stop pin 86 of the first embodiment has been replaced with a pair of stop pins 86a. Accordingly, the same reference numerals will be used in FIGS. 16 and 17 to indicate the parts of the bicycle pedal 10' of this second embodiment are the same parts in the first embodiment.

As mentioned above, the stop pin 86 of the first embodiment has been replaced with a pair of stop pins 86a. Preferably, the stop pins 86a of the second embodiment are inserted into the throughbores 86b formed in support members 58 and 60, respectively. More specifically, the bore 86b in support member 58 of the second embodiment is preferably a mirror image of the bore 86b formed in support member 60. Thus, one of the stop pins 86a is inserted into the bore 86b formed in support member 58 and the other stop pin 86a is inserted into the bore 86b formed in support member 60. Preferably, the stop pins 86a are knurled at one end and press-fitted into the bores 86b that are formed in support members 58 and 60. The stop pins 86a perform the same function as the stop pin 86 of the first embodiment. However, the use of a pair of stop pins 86a can make the bicycle pedal easier to assemble or manufacture. Since the operation of the bicycle pedal 10' of this second embodiment is the same as the operation of the bicycle pedal of the first embodiment, the second embodiment will not be discussed in further detail herein.

The terms of degree such as "substantially", "about" and "approximately" as used herein mean a reasonable amount of deviation of the modified term such that the end result is not significantly changed. These terms should be construed as including a deviation of ±25% of the modified term if this would not negate the meaning of the word it modifies. For example, "substantially parallel" as used herein may include two axes or two planes that deviate by 10°, but would not include 20°.

While only two embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents

What is claimed is:

1. A bicycle pedal adapted to be coupled to a bicycle shoe, comprising:

a pedal shaft having a first end for attachment to a bicycle crank and a second end;

a pedal body rotatably coupled to said second end of said pedal shaft, said pedal body having a first end and a second end with a cleat receiving surface located therebetween and a center longitudinal axis extending between said first and second ends;

a first clamping member coupled to said pedal body, said first clamping member having a first cleat engagement surface facing in a first direction; and a second wire clamping member coupled to said pedal body at a location that is longitudinally spaced from said first clamping member, said second wire clamping member including at least a first biasing portion and a retaining portion extending from said first biasing portion in a direction transverse to said center longitudinal axis of said pedal body, said first biasing portion being arranged to urge said retaining portion from a release position to a retained position about a main pivot axis, said retaining portion having a second cleat engagement surface facing in said first direction and being configured relative to said first biasing portion to pivot about a secondary pivot axis to apply a force toward said cleat receiving surface of said pedal body.

2. A bicycle pedal according to claim 1, wherein said first biasing portion is preloaded in said retained position.

3. A bicycle pedal according to claim 1, wherein said retaining portion has a cleat restricting section extending relative to said first biasing portion to form a lever arm that applies said force toward said cleat receiving surface of said pedal body.

4. A bicycle pedal according to claim 1, wherein
said retaining portion has a round cross-section.

5. A bicycle pedal according to claim 1, wherein said cleat receiving surface of said body lies in a first plane, said first cleat engagement surface of said first clamping member lying in a second plane located on a first side of said first plane and said second cleat engagement surface of said second wire clamping member lying in a third plane located on a second opposite side of said first plane.

6. A bicycle pedal according to claim 1, further comprising
a cleat having an attachment portion, a first coupling portion extending from one end of said attachment portion and a second coupling portion extending from the other end of said attachment portion.

7. A bicycle pedal according to claim 1, wherein said retaining portion has a cleat receiving section that is curved with its concaved surface facing toward said first clamping member.

8. A bicycle pedal according to claim 7, wherein
said retaining portion has a cleat restricting section located between said first biasing portion and said cleat receiving section, said cleat restricting section being curved with its convexed surface facing toward said first clamping member.

9. A bicycle pedal according to claim 7, wherein
said first clamping member has a cleat receiving recess that is curved with its concaved surface facing toward said second wire clamping member, said cleat receiving recess is spaced approximately 55 to 60 millimeters from said concaved surface of said retaining portion along said longitudinal axis when in said retained position.

10. A bicycle pedal according to claim 1, wherein
said first biasing portion includes a coiled section, a first arm extending from said coiled section and a second arm extending between said coiled section and said retaining portion.

11. A bicycle pedal according to claim wherein
said retaining portion has a cleat receiving section that is curved with its concaved surface facing toward said first clamping member.

12. A bicycle pedal according to claim 11, wherein
said retaining portion has a cleat restricting section located between said second arm of said first biasing portion and said cleat receiving section, said cleat restricting section being curved with its convexed surface facing toward said first clamping member.

13. A bicycle pedal according to claim 10, wherein said coiled section is mounted on a pivot pin that is coupled to said pedal body.

14. A bicycle pedal according to claim 13, wherein
said coiled section has a sleeve located therein for rotatably receiving said pivot pin.

15. A bicycle pedal according to claim 13, wherein
said main pivot axis and said secondary pivot axis are substantially parallel and extend in a direction transverse to said longitudinal axis of said pedal body.

16. A bicycle pedal according to claim 15, wherein
said retaining portion has a cleat restricting section extending relative to said first biasing portion to form a lever arm that applies said force toward said cleat receiving surface of said pedal body.

17. A bicycle pedal according to claim 1, wherein
said second wire clamping member further including a second biasing portion coupled to said retaining portion to further urge said retaining portion from said release position to said retained position.

18. A bicycle pedal according to claim 17, wherein
said first and second biasing portions are preloaded in said retained position.

19. A bicycle pedal according to claim 17, wherein
said retaining portion has a cleat restricting section extending relative to said first and second biasing portions to form a lever arm that applies said force toward said cleat receiving surface of said pedal body.

20. A bicycle pedal according to claim 17, wherein
each of said first and second biasing portions includes a coiled section, a first arm extending from said coiled section and a second arm extending between said coiled section and said retaining portion.

21. A bicycle pedal according to claim 20, wherein
said coiled sections are preloaded in said retained position.

22. A bicycle pedal according to claim 20, wherein
said coiled sections are mounted on a pivot pin that is coupled to said pedal body.

23. A bicycle pedal according to claim 22, wherein
said coiled sections have a sleeve located therein for rotatably receiving said pivot pin.

24. A bicycle pedal according to claim 23, wherein
said main pivot axis and said secondary pivot axis are substantially parallel and extend in a direction transverse to said longitudinal axis of said pedal body.

25. A bicycle pedal according to claim 17, wherein
said retaining portion has a cleat restricting section extending relative to said first and second biasing portions to form a lever arm that applies said force toward said cleat receiving surface of said pedal body.

26. A bicycle pedal according to claim 25, wherein
said retaining portion has a cleat receiving section that is curved with its concaved surface facing toward said first clamping member.

27. A bicycle pedal according to claim 26, wherein
said retaining portion has a pair of cleat restricting sections located on opposite sides of said cleat receiving section, each of said cleat restricting sections being curved with a convexed surface facing toward said first clamping member.

28. A bicycle pedal adapted to be coupled to a bicycle shoe, comprising:
a pedal shaft having a first end for attachment to a bicycle crank and a second end;
a pedal body rotatably coupled to said second end of said pedal shaft, said pedal body having a first end and a second end with a cleat receiving surface located therebetween and a center longitudinal axis extending between said first and second ends;
first clamping member coupled to said pedal body, said first clamping member having a first cleat engagement surface facing in a first direction; and
a second wire clamping member coupled to said pedal body at a location that is longitudinally spaced from said first clamping member, said second wire clamping member including a first biasing portion, a second biasing portion and a retaining portion extending between said first and second biasing portions in a direction transverse to said center longitudinal axis of said pedal body, said first and second biasing portions being coupled to urge said retaining portion from a release position to a retained position about a main pivot axis, said first and second biasing portions and said retaining portion being arranged such that to apply a substantially the same force on said retaining portion during rearward movement of said retaining portion by a lateral twisting motion of a cleat on said retaining portion, said retaining portion being arranged to pivot relative to said first and second biasing portions about a secondary pivot axis that extends in a direction transverse to said longitudinal axis of said pedal body to apply a force toward said cleat receiving surface of said pedal body.

29. A bicycle pedal according to claim 28, wherein said retaining portion has a cleat restring section extexding relative to said first and second biasing portions form a lever arm that applies said rofoce toward said cleat receiving surface of said peddle body.

30. A bicycle pedal according to claim 28, wherein each of said first and second biasing portions includes a coiled section, a first arm extending from said coiled section and a second arm extending between said coiled section and said retaining portion.

31. A bicycle pedal according to claim 30, wherein said coiled sections are preloaded in said retained position.

32. A bicycle pedal according to claim 31, wherein said coiled sections are mounted on a pivot pin that is coupled to said pedal body.

33. A bicycle pedal according to claim 32, wherein said coiled sections have a sleeve located therein for rotatably receiving said pivot pin.

34. A bicycle pedal adapted to be coupled to a bicycle shoe, comprising:

a pedal shaft having a first end for attachment to a bicycle crank and a second end;

a pedal body rotatably coupled to said second end of said pedal shaft, said pedal body having a first end and a second end with a cleat receiving surface located therebetween and a center longitudinal axis extending between said first and second ends;

a first clamping member coupled to said pedal body, said first clamping member having a first cleat engagement surface facing in a first direction; and a second wire clamping member coupled to said pedal body at a location that is longitudinally spaced from said first clamping member, said second wire clamping member including a first biasing portion, a second biasing portion and a retaining portion extending between said first and second biasing portions in a direction transverse to said center longitudinal axis of said pedal body, said first and second biasing portions being coupled to urge said retaining portion from a release position to a retained position about a main pivot axis, said first and second biasing portions and said retaining portion being arranged such that to apply a substantially the same force on said retaining portion during rearward movement of said retaining portion by a lateral twisting motion of a cleat on said retaining portion, each of said first and second biasing portions including a coiled section preloaded in said retained position, a first arm extending from said coiled section and a second arm extending between said coiled section and said retaining portion, said retaining portion being arranged to pivot relative to said first and second biasing portions about an axis that extends in a direction transverse to said longitudinal axis of said pedal body.

35. A bicycle pedal according to claim 34, wherein said retaining portion has a cleat restricting section extending relative to said first and second biasing portions to form a lever arm that applies said force toward said cleat receiving surface of said pedal body.

36. A bicycle pedal according to claim 35, wherein said retaining portion has a cleat receiving section that is curved with its concaved surface facing toward said first clamping member.

37. A bicycle pedal according to claim 36, wherein said retaining portion has a pair of cleat restricting sections located on opposite sides of said cleat receiving section, each of said cleat restricting sections being curved with a convexed surface facing toward said first clamping member.

* * * * *